Feb. 26, 1963
B. A. PHILLIPS ET AL
3,078,690
ABSORPTION REFRIGERATION APPARATUS
Filed July 21, 1959
3 Sheets-Sheet 1
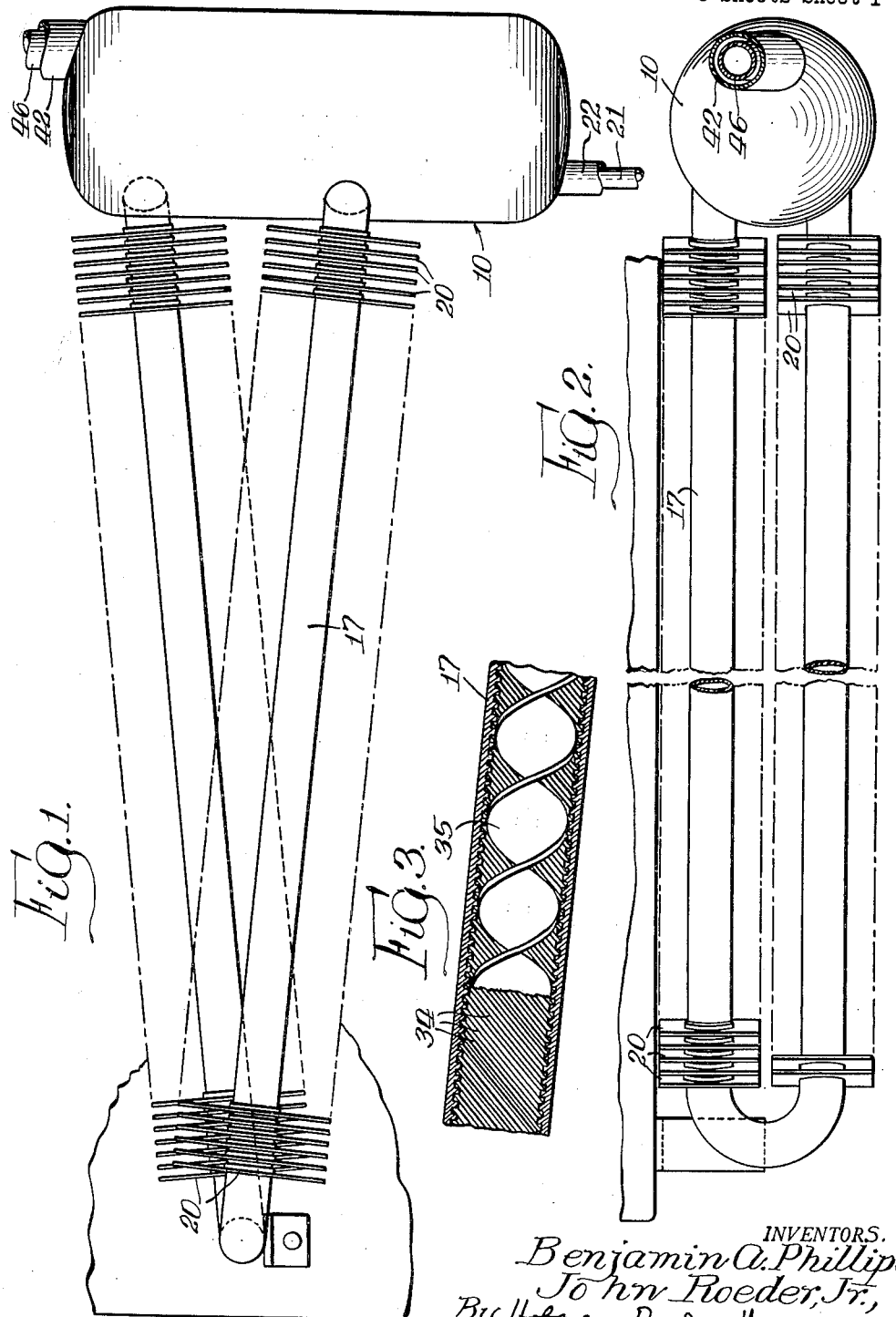
INVENTORS.
Benjamin A. Phillips
John Roeder, Jr.,
By Hofgren, Brady, Wegner,
Allen & Stellman
Attys.

Feb. 26, 1963  B. A. PHILLIPS ET AL  3,078,690
ABSORPTION REFRIGERATION APPARATUS
Filed July 21, 1959  3 Sheets-Sheet 2
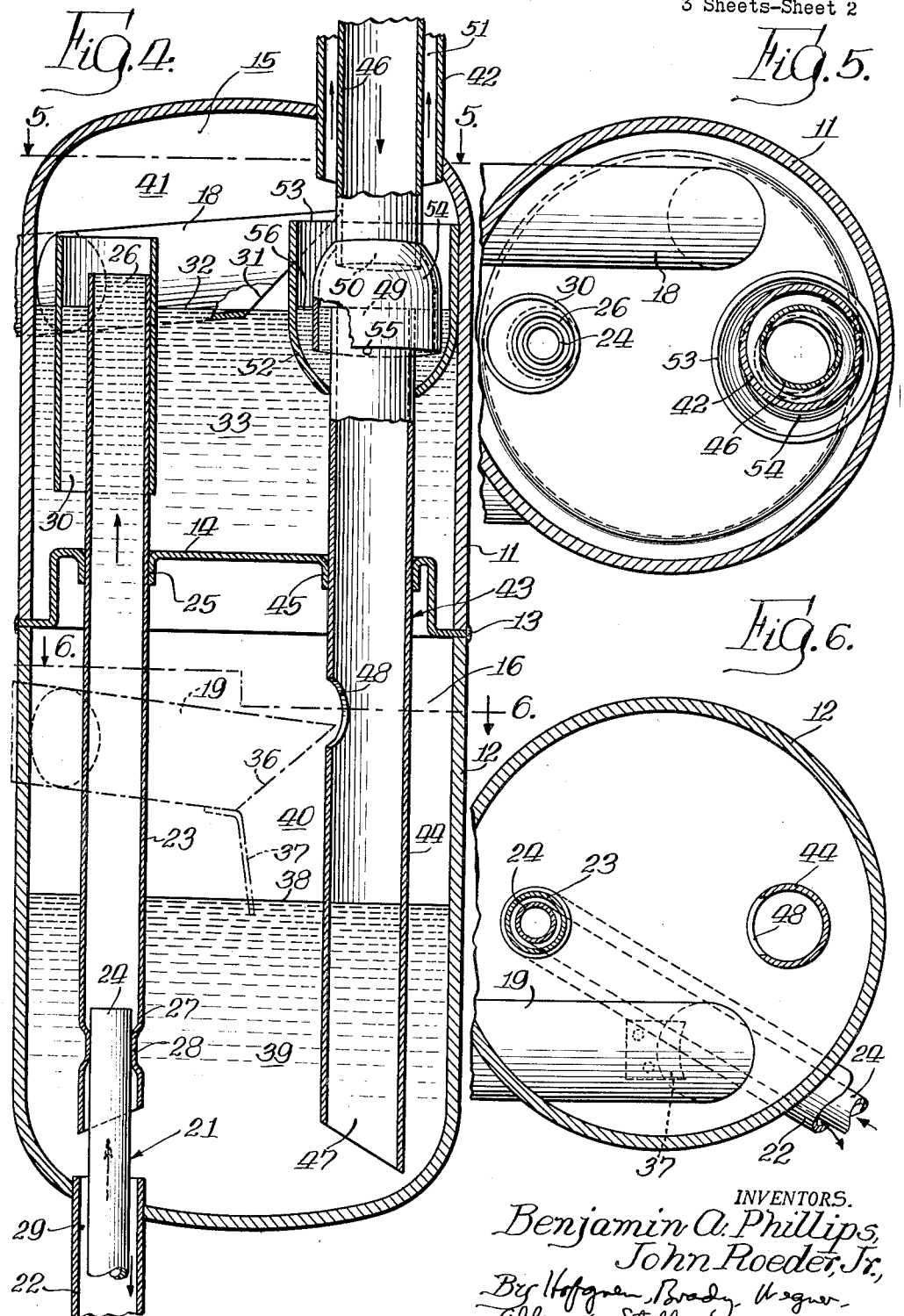
INVENTORS.
Benjamin A. Phillips,
John Roeder, Jr.

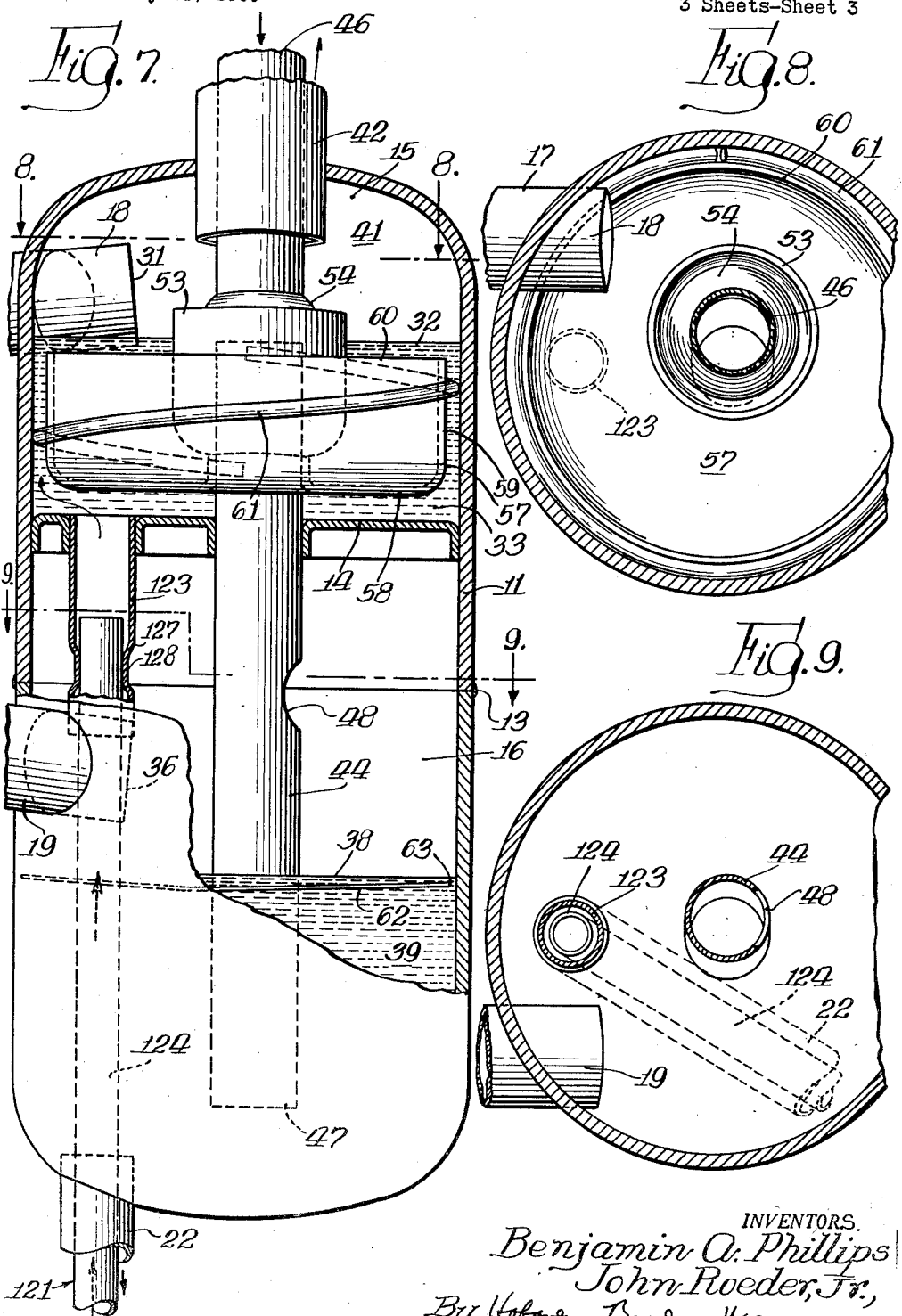

United States Patent Office 3,078,690
Patented Feb. 26, 1963

3,078,690
ABSORPTION REFRIGERATION APPARATUS
Benjamin A. Phillips and John Roeder, Jr., Benton Harbor, Mich., assignors to Whirlpool Corporation, a corporation of Delaware
Filed July 21, 1959, Ser. No. 828,584
10 Claims. (Cl. 62—491)

This invention relates to an absorber assembly for an absorption refrigeration system in which gaseous refrigerant from a gas rich in refrigerant is absorbed in a liquid solution weak in dissolved refrigerant so that the rich gas thereupon becomes weak and the weak liquid becomes rich.

The absorber assembly of this invention is particularly useful in an absorption refrigeration system of a uniform pressure type in which an inert gas or auxiliary pressure equalizing fluid is employed. In such a system the refrigerant may be ammonia, the inert gas may be hydrogen and the absorption liquid may be water, which will thereby form a solution with the ammonia refrigerant. In such a system a generator is used to boil off ammonia gas from the liquid rich in dissolved ammonia. The ammonia gas is then conveyed to a condenser where it is condensed to a liquid form before being conveyed into the evaporator for subsequent evaporation and cooling. The resulting weak liquid which is relatively poor in dissolved ammonia is then conveyed to the absorber and is there intermingled with rich gas containing relatively large amounts of ammonia for absorption of ammonia in the liquid whereupon the liquid becomes rich liquid. From this absorber the rich liquid is conveyed back to the generator where the process is repeated. The invention here is concerned with the absorber portion of such an absorption refrigeration system.

One of the features of this invention is to provide an absorber assembly for an absorption refrigeration system comprising means defining a chamber for a body of absorption liquid weak in dissolved refrigerant, an absorber conduit having an entrance in this chamber through which the weak liquid is adapted to flow, a conduit for weak liquid having an exit emptying into the chamber and means for intermingling incoming weak liquid from the weak liquid conduit and a volume of said body of weak liquid located between said exit and entrance.

Another feature of the invention is to provide such a structure wherein the intermingling means includes a baffle having a lower end immersed in the body of liquid and positioned to intercept incoming liquid from said exit and direct it into said body prior to reaching said entrance.

A further feature of the invention is to provide an absorber assembly comprising means defining a chamber for a body of weak liquid and an absorber conduit having an entrance end in this chamber through which liquid from the body is adapted to flow in contact with a gaseous refrigerant flowing countercurrently to the flow of liquid in which the conduit at the entrance end is shaped to aid in directing outflowing gaseous refrigerant toward the body.

Yet another feature of the invention is to provide an absorber assembly including the chamber having a side wall with the conduit at the entrance end thereof having a longitudinal axis arranged at an acute angle to this wall.

Another feature of the invention is to provide an improved absorber assembly for an absorption refrigeration system comprising means defining a chamber for a body of absorption liquid weak in dissolved refrigerant, the weak liquid chamber having a top above the maximum level of said body to provide space for weak gas, means defining a chamber for a body of rich absorption liquid having a space thereabove to provide for rich gas, a weak gas conduit leading from said weak gas space for weak gas flow therefrom, a rich gas conduit leading to said rich gas space for rich gas flow into this space, the conduits being in heat exchange relationship with each other and means in the weak liquid chamber for collecting condensate from the weak gas conduit and maintaining the condensate separate from the weak liquid.

Yet another feature of the invention is to provide such an assembly in which the rich liquid chamber is at a lower level than the weak liquid chamber, the rich gas conduit including a first rich gas tube having an inner end extending into the weak liquid chamber in heat exchange relationship with the weak gas conduit and a rich gas tube extending from the weak liquid chamber into the rich liquid chamber having its upper end adjacent the inner end of this first tube, in combination with means forming a liquid seal between said inner end and said upper end to direct rich gas from the first tube into the second tube and including means in the second tube forming an exit for rich gas into the rich gas space and means for directing condensate from the weak gas into the liquid seal for supplying liquid thereto.

Another feature of the invention is to supply such an assembly in which the liquid seal includes an open top receptacle surrounding said upper end and into which said upper end extends with the receptacle being located beneath the weak gas conduit and said inner end of the first rich gas tube surrounding said upper end of the second rich gas tube, the condensate from the weak gas conduit forming a liquid seal between the receptacle, the upper end and said inner end to direct rich gas from the first tube into the second tube.

A further feature of the invention is to provide an improved absorber assembly comprising means defining a chamber for a body of weak absorption liquid with the weak liquid chamber having a top above the maximum level of this body to provide space for weak gas, means forming a rich liquid chamber also having space for a rich gas thereabove, a weak gas conduit communicating with the weak gas space for weak gas flow from the space, means for cooling the weak gas conduit thereby forming condensate and means for bringing this condensate to the rich liquid body for mingling therewith.

A further feature of the invention is to provide an absorber assembly for an absorption refrigeration system comprising a container including an upper shell and a lower shell having joined edges, a transverse partition in one of the shells, or at the junction between the shells, defining an upper chamber for a body of weak liquid and a lower chamber for a body of rich liquid, the upper chamber having a weak gas space above the weak liquid and the lower chamber having a rich gas space above the rich liquid, a conduit for weak liquid extending through the bottom shell and the partition into the upper chamber and a conduit for rich liquid extending from the bottom shell.

Yet another feature of the invention is to provide such an improved assembly in which the conduits are in heat exchange relationship exteriorly of the bottom shell.

Another feature of the invention is to provide such an assembly in which the weak liquid conduit includes a first tube held by the partition and a second tube telescopically associated with the first tube and held thereto at a common area with the outer tube of this pair of tubes preferably being of appreciably larger diameter at the telescoped sections except at this common area.

Another feature of the invention is to provide such an assembly having the weak gas space, weak liquid body, rich gas space and rich liquid body in combination with a conduit for rich gas extending through the upper shell, upper chamber and partition into the lower chamber and a conduit for weak gas extending from the upper shell, with the preferred construction having these conduits in heat exchange relationship exteriorly of the upper shell.

Yet another feature of the invention is to provide such an assembly in which the rich gas conduit includes a first tube held by the partition and a second tube communicating therewith, the tubes having telescopically associated adjacent end portions in the upper chamber, the preferred construction having these end portions spaced from each other.

Other features and advantages of the invention will be apparent from the following description of certain embodiments thereof taken in conjunction with the accompanying drawings. Of the drawings:

FIGURE 1 is a side elevational view of an absorber assembly embodying the invention.

FIGURE 2 is a plan view thereof partially broken away.

FIGURE 3 is a longitudinal sectional view through a portion of the absorber tube.

FIGURE 4 is a vertical sectional view through the container of the absorber assembly illustrating a first embodiment of the invention.

FIGURE 5 is a transverse sectional view taken substantially along line 5—5 of FIGURE 4.

FIGURE 6 is a transverse sectional view taken substantially along line 6—6 of FIGURE 4.

FIGURE 7 is a view similar to FIGURE 4 but illustrating a second embodiment of the invention.

FIGURE 8 is a transverse sectional view taken substantially along line 8—8 of FIGURE 7.

FIGURE 9 is a transverse sectional view taken substantially along line 9—9 of FIGURE 7.

In the specification and claims the words "weak" and "rich" are used in the customary sense in this art. Thus they are used to express the relative presence of refrigerant such as ammonia in either the gas or the liquid. The term "liquid" is used to indicate a solution of the refrigerant of which an example is ammonia dissolved in water. The term "gas" refers to a mixture of refrigerant gas and inert gas of which hydrogen is the customary gas. Thus the term "weak gas" indicates a mixture of ammonia and hydrogen for example which is relatively poor in ammonia. The term "rich gas" indicates such a gas that is relatively strong in ammonia. The term "rich liquid" indicates a water solution of ammonia containing a relatively large amount of dissolved ammonia. The term "weak liquid" indicates such a solution in which the amount of dissolved ammonia is relatively small.

The absorber assembly comprises a vertically elongated container 10 including an upper shell 11 and a lower shell 12 each of generally cup-shaped configuration having their abutting edges joined together as indicated at 13. A transverse partition 14 or separator is positioned in the upper shell 11 to divide the container 10 into an upper chamber 15 and a lower chamber 16. This transverse partition 14 can be formed and welded between the upper and lower shells 11 and 12 respectively, as best shown in FIGURE 4. A generally V-shaped absorber tube 17 has one end 18 extending into the upper chamber 15 and the other end 19 extending into the lower chamber 16. In FIGURE 4 broken lines are used to indicate the relationship of the lower end 19 to the other elements in this lower chamber in vertical projection.

As can be seen in FIGURE 1 the absorber tube 17 extends laterally away from the container 10 for a considerable distance. The tube 17 is provided with a plurality of closely spaced metal fins 20 to aid in the air cooling of the tube.

Extending through the bottom shell 12 and the partition 14 into the upper chamber 15 is a weak liquid conduit 21 for conveying weak liquid into the upper chamber 15. As is customary in absorption refrigeration structures, this conduit leads from the generator (not shown). Leading from the bottom of the lower shell 12 is a rich liquid conduit 22 leading to the generator. Thus, following customary practice, the rich liquid flows to the generator through the conduit 22 and in the generator the dissolved ammonia is boiled off. The resulting weak liquid then flows through the conduit 21 into the upper chamber 15, as previously described.

The weak liquid conduit 21 within the absorber includes a first tube 23 extending through and frictionally held in an opening in the partition 14 defined by a downwardly extending flange 25 and a second tube 24. The first tube 23 has its upper end 26 extending a considerable distance above the partition 14. The lower end portion 27 of this first tube is adjacent the bottom of the shell 12. The upper end of the second weak liquid tube 24 is telescopically received within this lower portion 27. The lower portion 27 is of equal size of larger diameter than the upper end of the second tube 24. The lower end portion 27 is of reduced diameter in a circumferential area 28 in order to join the tubes 24 and 23 together frictionally. It is, of course, understood that all the joints within container 10 may be made by welding or brazing as well as by frictional fits. The second weak liquid tube 24 is located within the rich liquid conduit 22 and spaced inwardly thereof so as to form a heat exchanger. The rich liquid tube 22 extends through the bottom of the shell 12 and provides space 29 between the tube 24 and the conduit 22 for flow of rich liquid from the lower chamber 16.

The upper end 26 of the tube 23 has attached thereto a deflector conduit 30 of larger diameter than this end 26 and having open ends extending above and below the upper open end of the portion 26. The bottom of this deflector 30 extends downwardly to a point a short distance above the partition 14. Although not shown, the deflector 30 may be closed at the top with only a vent hole therein. This would tend to prevent vaporization of the incoming weak liquid.

The upper end 18 of the absorber tube 17 within the chamber 15 has an open entrance 31 that is undercut as indicated for example in FIGURE 4. The lowest point of this entrance 31 determines the level 32 of weak liquid body 33. As can be seen this level 32 is beneath the upper end 26 and the upper end of the deflector conduit 30 is above the upper end 26 of tube 23.

As shown in FIGURE 3 the interior of the absorber tube 17 is provided with a plurality of closely adjacent internal helical grooves 34. This interior also contains a helicoid 35. These internal grooves are shown in Patent 2,691,281. The combination of the grooves 34 and the helicoid 35 helps insure good contact between liquid and gas within the tube 17.

The lower end 19 of the tube 17 whose relative vertical position in the assembly is indicated by the broken lines of FIGURE 4 has a lower exit 36 undercut similarly to the entrance 31. The tube end 19 has attached to the bottom thereof a downwardly extending outwardly sloped bracket 37 extending to beneath the surface level 38 on the body 39 of rich liquid in the lower chamber 16. A rich gas space 40 is provided above this liquid level 38.

Extending into the top of the upper chamber 15 and terminating well above the weak liquid level 32 and in the weak gas space 41 above this level is a weak gas conduit 42. Extending through the upper shell 11, partition 14 and into the bottom chamber 16 is a rich gas conduit 43. This rich gas conduit includes a first tube frictionally held by the partition 14 and located in an opening defined by a downwardly extending flange 45. The rich gas conduit also includes a second tube 46 axially aligned with but spaced from the first tube 44. The first tube 44 has an open bottom end 47 extending to adjacent the bottom of the lower shell 12 and has a side opening 48 opening into the rich gas space 40 above the rich liquid level 38. The first tube 44 has its upper end 49 within the upper chamber 15. The lower end 50 of the second tube 46 is adjacent but spaced from this upper end 49 and is axially aligned with this upper end. The second rich gas tube 46 is located within and spaced from the weak gas conduit 42 so as to form a heat exchanger with a space 51 for the flow of weak gas from the space 41.

In order to collect condensate from the relatively warm and humid weak gas in contact with the cold rich gas tube 46 and form a liquid seal between the tubes 44 and 46 there is provided a liquid receiving cup 52 on the upper end 49 of the tube 44. The upper end extends through and into the bottom of the cup 52 to a point above this bottom. The cup 52 is located beneath the weak gas tube or conduit 42 and has a diameter larger than that of the conduit 42. The upper edge 53 of this cup is located within the gas space 41 a considerable distance above the weak liquid level 32. A second and inverted cup 54 is attached to the lower end 50 of tube 46 with this lower end extending into the cup 54. The bottom edge 55 of this cup 54 is spaced below the upper extremity of the end 49 and is spaced from cup 52. The inverted cup 54 serves as an enlarged extension of the rich gas tube 46. With this arrangement moisture condensed from the weak gas in the space 51 drips into the cup 52 and forms a liquid seal 56. As is shown in FIGURE 4, this liquid 56 occupies space between the cup 52, cup 54 and upper end 49. The upper end 49 is beneath the upper edge 53 of the cup 52 so that when the amount of moisture 56 in the cup 52 exceeds a predetermined amount the excess will overflow the upper end 49 and will flow down tube 44 into the body 39 of rich liquid. Rich gas in the tube 44 will flow through the side opening 48 into the rich gas space 40.

The operation of this first embodiment of the absorber assembly is as follows. Weak liquid flows upwardly through the conduit 21 to overflow the upper end 26. The deflector baffle conduit 30 directs this incoming weak liquid downwardly to adjacent the bottom of the weak liquid body 33 to mingle with the body of weak liquid. Weak liquid from the body 33 flows into the entrance 31 of the upper end 18 of the absorber tube so that the position of this entrance end determines the level 32 of the body 33. Weak liquid thereupon flows down through this absorber tube 17 in intimate contact with rich gas flowing from the space 40 in the tube 17 countercurrently to the liquid flow in this tube. The intermingling of the rich gas and the weak liquid in the tube 17 causes the refrigerant (ammonia from the gas to be absorbed in the liquid. By reason of this the liquid emerging from the lower exit 36 of the tube 17 is now rich liquid and falls into the rich liquid body 39. Similarly, the rich gas from which the ammonia is thus extracted becomes weak gas and flows out the upper end 18 of the tube 17 into the weak gas space 41. Rich liquid then flows from the body of liquid 39 through the space 29 between the conduits 21 and 22 to the generator (not shown). Weak gas from the upper space 41 flows through the space 51 between the weak gas tube 42 and the rich gas tube 46 and is conducted to the evaporator (not shown). In the evaporator the liquid refrigerant from the condenser (not shown) evaporates into the weak gas in the customary manner. Because of this evaporation of refrigerant into the gas the gas becomes rich gas and being heavier than the weak gas which is predominantly hydrogen flows back down the rich gas conduit 43 into the rich gas space 40 through the opening 48. The rich gas in the tube 46 on its way from the evaporator is quite cool and condenses moisture from the relatively warm and humid weak gas in the space 51. This moisture flows down into the cup 52 to provide the body of water 56 which provides the liquid seal between the adjacent ends of the tubes 44 and 46 which make up the rich gas conduit 43.

The embodiment of FIGURES 7, 8 and 9 operates similarly to the previously described embodiment. In this second embodiment of FIGURES 7–9 the same numerals are used to identify the same elements. Reference may therefore be had to the description of the first embodiment for a description of these same elements.

In the second embodiment the first tube 123 of the weak liquid conduit 121 has its upper end terminating at the transverse partition 14. Furthermore this first tube 123 has its lower end adjacent the partition. The second weak liquid tube 124 extends into the lower end of the first tube 123 and is telescopically received therein at the reduced circumferential area 128.

In this second embodiment the first rich gas tube 44 is exactly the same as the corresponding tube except that in this second embodiment the lower end 47 is at right angles to the longitudinal axis of the tube while in the first embodiment it is sloped. However the operation is exactly the same. In this second embodiment the liquid seal formed by the associated cups 52 and 54 is exactly the same as the seal described in connection with the first embodiment.

A major difference between the second embodiment and the first embodiment is in the deflector means for mingling incoming weak liquid into the body 33 of weak liquid. In this second embodiment the deflector is in the form of a shallow cup 57 having its bottom 58 spaced above the partition 14 and its sides 59 spaced from the sides of the upper shell 11. The upper edge 60 of this cup is beneath the surface 32 of the body of weak liquid. Located in the space between the cup side 59 and the shell 11 is a wire 61 extending in a helix for at least 360°. The lower end of this wire is adjacent the bottom 58 of the cup while the upper end is adjacent the upper edge 60 of the cup. The wire is of sufficient thickness to essentially occupy all the space in which it is located. This combination of the cup 57 and wire 61 serves to diffuse the incoming weak liquid in the conduit 121 into and through the weak liquid body 33 before the weak liquid flows into the entrance end 31 of the upper end 18 of the absorber tube 17. In addition, with the structure defined immediately above, the incoming weak liquid is more effectively cooled because of the helical path adjacent the outer periphery of shell 11. The entrance end 31 of this second embodiment is exactly the same as the first embodiment except that in the second embodiment the entrance end is not undercut. Similarly the exit end 36 in the lower chamber 16 differs from the exit end in the first embodiment by not being undercut.

Referring to both embodiments, the upper chamber 15 contains a large volume of weak liquid as indicated at 33 in comparison to previous absorbers. This large volume provides a supply of weak liquid even during periods of high load conditions where the absorption refrigerator is operating at or adjacent its peak. This adequate supply of weak liquid makes possible more rapid recovery of evaporator temperature than has been possible in the past, thereby resulting in maximum cooling. As has been previously described the entrance 31 to the absorber tube end 18, as shown in the FIGURE 4 embodiment, is undercut at a relatively steep angle. This tends to direct the outflowing weak gas into the weak gas space 41 toward the liquid surface 32 for further removal of the remaining ammonia in this weak gas. To increase this absorption effect the tube end 18 may be bent downwardly toward the surface of the weak liquid. Thus this surface also functions as a refrigerant absorption medium.

Also in the embodiment of FIGURE 4 the upper end 26 of the weak liquid conduit is above the liquid surface 32. This prevents the backward flow of weak liquid to the generator or boiler during periods of by-pass flame operation. With this construction only the weak liquid in the tube 23 flows back and it flows only until the level of liquid in this tube reaches the level 38 of rich liquid in the lower chamber 16.

The intermixing of the incoming weak liquid with the body 33 of weak liquid caused by baffles 30 in the first embodiment and 57 in the second embodiment have a number of unobvious advantages. This intermingling minimizes the effect of relatively rich weak liquid arriving during high load periods. During these high load periods the generator is sometimes not able to boil off completely all the ammonia from the rich liquid. Under these conditions instead of relatively weak liquid returning to the body 33 of liquid as is desirable the returning liquid is somewhat stronger with ammonia than is desired. This relatively richer liquid reduces absorption capacity. However, this effect is avoided by intermingling the liquid with the body of weak liquid in the upper chamber before the weak liquid can enter the absorber tube 17, thus preventing a comparatively strong liquid flowing directly into the absorber tube.

As mentioned earlier, the top 49 of the rich gas tube 44 is lower than the edge 53 of the cup 52. Thus when the amount of water 56 exceeds a predetermined amount it will overflow the edge of this top 49 and flow into the tube 44 down the side into the body 39 of rich liquid. This serves to remove scale from the interior of the tube 44 by dissolving it. The scale formation is due to the fact that the rich gas coming from the evaporator through the conduit 43 is very cold and is dry. This causes evaporation of any liquid on the interior of this conduit or at the edge of hole 48 with the resulting deposition of the sodium chromate. However, the overflow of the water, as previously described, humidifies this gas to retard evaporation of the solution and in addition dissolves and washes away any scale that might be present.

Under certain operating conditions it is possible to have an overflow of liquid refrigerant to the absorber 10 through the rich gas conduit 43. In prior structures this overflow of refrigerant was emptied on the surface 38 of the rich liquid 39. This resulted in the formation of an insulating layer of ammonia on the surface that had a tendency to reduce the effectiveness of any absorption that might take place in the rich liquid chamber 16. In order to avoid this the absorber of this invention extends the lower tube 44 downwardly beneath the surface 38 of the rich liquid 39 so as to empty the overflowing ammonia liquid beneath this surface. The side opening 48 is provided so that the rich gas can escape through this opening into the space 40.

The liquid refrigerant flows downwardly and at the bottom end 47 of the tube 44 it mixes with the rich liquid as it tends to flow upwardly through the body 39, being lighter than the rich liquid. Because of this the insulating layer of ammonia cannot form on the surface 38. In the embodiment of FIGURE 7 an additional element 62 is provided in order to aid in preventing the formation of this insulating layer. This is a plate located beneath the surface 38 and sloping slightly upwardly and outwardly from a central portion. This plate is attached to the bottom shell 12 at spaced points, with edge portions 63 of this plate being spaced from the shell 12 to permit liquid flow therebetween. Because the plate 62 is attached at spaced points to the bottom shell 12 it also serves as an additional heat transfer member.

Another important feature of this invention is the manner in which the absorber may be assembled. This feature will be described in conjunction with the first embodiment of FIGURE 4, but it is also applicable to the second embodiment of FIGURE 7. Thus, in the first embodiment the first weak liquid tube 23 and the first rich gas tube 43 are attached by friction fit only to the partition 14. The first tube 23 carries the baffle 30 while the first tube 43 carries the cup 52. In the second embodiment of FIGURE 7 the tube 44 also carries the baffle 57. The upper shell 11 also carries the weak gas conduit 42 which is attached thereto. In assembling the upper portion of the absorber, therefore, it is only necessary to insert the partition 14 into the shell 11 for a friction fit only with the above-mentioned parts that are attached to this partition, thereby being properly positioned within this upper shell.

The rich liquid conduit 22 is attached to the bottom of the lower shell 12 in the position shown. Then the lower shell may be joined to the upper shell 11 in the manner shown and the second tube 24 inserted through the conduit 22 and telescoped into the lower end portion 27. The tube 24 may be forcibly inserted into the circumferential reduced area 28 of this end portion 27 to make sealing contact therewith. Because of the low pressure differentials involved, it is not necessary that this joint be soldered, welded or the like as the forced fit will provide a sufficient seal.

Thus one of the chief advantages of the absorber assembly of this invention is the ease of assembling it. A further important advantage is the considerable reduction in the number of welds required. This, of course, results in a considerable monetary saving.

In the preferred embodiment of FIGURES 4, 5 and 6 the previously described bottom bracket 37 is provided on the inner end 19 of the absorption tube 17. This bracket permits flow of liquid from the end portion 19 of the tube into the liquid body 39 without resulting in a splashing noise. Thus, the liquid flows from the end 36 down the bracket 37 into the body 39.

Having described our invention as related to the embodiments shown in the accompanying drawings, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows.

We claim:

1. An absorber assembly for an absorption refrigeration system, comprising: means defining a chamber for a body of absorption liquid weak in dissolved refrigerant; an absorber conduit having an entrance in said chamber through which said liquid is adapted to flow; a conduit for weak liquid having an exit emptying into said chamber; and a baffle means having a lower end immersed in said body and positioned to intercept incoming liquid from said exit and direct it into said body in a circuitous path prior to reaching said entrance.

2. The assembly of claim 1 wherein said baffle means includes a conduit member surrounding said exit and having open ends, one above and one below the liquid level of said body.

3. The assembly of claim 1 wherein said exit is at the bottom of said body, and the baffle means includes a member spaced from the bottom and sides of said chamber and located beneath said entrance.

4. The assembly of claim 3 wherein the space between said member and the sides of the chamber contains means defining a helical path for said incoming liquid.

5. An absorber assembly for an absorption refrigeration system, comprising: a container including an upper shell and a lower shell having joined edges; a transverse partition in one of said shells defining an upper chamber in said container for a body of weak liquid and a lower chamber in said container for a body of rich liquid, the weak liquid chamber having a top above the maximum level of said body of weak liquid to provide space for weak gas and the rich liquid chamber having a top above the maximum level of said body of rich liquid to provide space for rich gas; a conduit for weak liquid extending through the bottom shell and the partition into the upper chamber; a conduit for rich liquid extending from the bottom shell; and an absorber conduit for both liquid and gas in contact with each other extending from substantially said upper chamber to said lower chamber.

6. An absorber assembly for an absorption refrigeration system, comprising: a container including an upper shell and a lower shell having joined edges; a transverse partition in one of said shells defining an upper chamber in said container for a body of weak liquid and a lower chamber in said container for a body of rich liquid, the weak liquid chamber having a top above the maximum level of said body of weak liquid to provide space for weak gas and the rich liquid chamber having a top above the maximum level of said body of rich liquid to provide space for rich gas; a conduit for rich gas extending through the upper shell, upper chamber and partition into the lower chamber; a conduit for weak gas extending from the upper shell; and an absorber conduit for both liquid and gas in contact with each other extending from substantially said upper chamber to said lower chamber.

7. An absorber assembly for an absorption refrigeration system, comprising: a container including an upper shell and a lower shell having joined edges; a transverse partition in one of said shells defining an upper chamber in said container for a body of weak liquid and a lower chamber in said container for a body of rich liquid, the weak liquid chamber having a top above the maximum level of said body of weak liquid to provide space for weak gas and the rich liquid chamber having a top above the maximum level of said body of rich liquid to provide space for rich gas; a conduit for weak liquid extending through the bottom shell and the partition into the upper chamber; a conduit for rich liquid extending from the bottom shell; a conduit for rich gas extending through the upper shell, upper chamber and partition into the lower chamber; a conduit for weak gas extending from the upper shell; and an absorber conduit for both liquid and gas in contact with each other extending from substantially said upper chamber to said lower chamber.

8. An absorber assembly for an absorption refrigeration system, comprising: means defining a chamber for a body of absorption liquid weak in dissolved refrigerant; an absorber conduit having an entrance in said chamber through which said liquid is adapted to flow; a conduit for weak liquid having an exit emptying into said chamber; and deflector means adjacent said exit for intermingling incoming weak liquid from the weak liquid conduit in a circuitous flow path with a volume of said body of weak liquid between said exit and entrance.

9. An absorber assembly for an absorption refrigeration system, comprising: means defining a chamber for a body of absorption liquid weak in dissolved refrigerant, the chamber having a side wall; a weak liquid supply conduit extending into the weak liquid chamber; means defining a chamber for a body of absorption liquid rich in dissolved refrigerant; a conduit for rich liquid extending from said rich liquid chamber; a conduit for rich vapor extending into said rich liquid chamber and a conduit for weak vapor extending from said weak liquid chamber; and an absorber conduit connecting said weak liquid chamber to said rich liquid chamber through which weak liquid is adapted to flow in contact with a vapor rich in refrigerant vapor flowing countercurrently therein, said absorber conduit extending into said weak liquid chamber through said side wall, the end of said absorber conduit being slanted with respect to the horizontal, whereby the absorption of vapor by the weak liquid is facilitated in said weak liquid chamber.

10. An absorber assembly for an absorption refrigeration system, comprising: means defining a chamber for a body of absorption liquid weak in dissolved refrigerant, the chamber having a curved side wall; a weak liquid supply conduit extending into the weak liquid chamber; means defining a chamber for a body of absorption liquid rich in dissolved refrigerant; a conduit for rich liquid extending from said rich liquid chamber; a conduit for rich vapor extending into said rich liquid chamber and a conduit for weak vapor extending from said weak liquid chamber; and an absorber conduit connecting said weak liquid chamber to said rich liquid chamber through which weak liquid is adapted to flow in contact with a vapor rich in refrigerant vapor flowing countercurrently therein, said absorber conduit extending into said weak liquid chamber through said curved side wall, the longitudinal axis of said conduit lying substantially along a chord of said curved side wall, whereby the absorption of vapor by the weak liquid is facilitated in said weak liquid chamber.

References Cited in the file of this patent

UNITED STATES PATENTS

| | | |
|---|---|---|
| 1,897,997 | Babcock | Feb. 21, 1933 |
| 2,066,660 | Thomas | Jan. 5, 1937 |
| 2,298,029 | Blomquist | Oct. 6, 1942 |
| 2,583,769 | Gaugler | Jan. 24, 1952 |
| 2,640,331 | Backstrom | June 2, 1953 |
| 2,691,281 | Phillips | Oct. 12, 1954 |
| 2,736,175 | Ostergren | Feb. 28, 1956 |

FOREIGN PATENTS

| | | |
|---|---|---|
| 610,552 | Germany | Mar. 26, 1935 |